J. C. BANNIGAN.
CULTIVATOR-TEETH.
No. 172,373.
Patented Jan. 18, 1876.
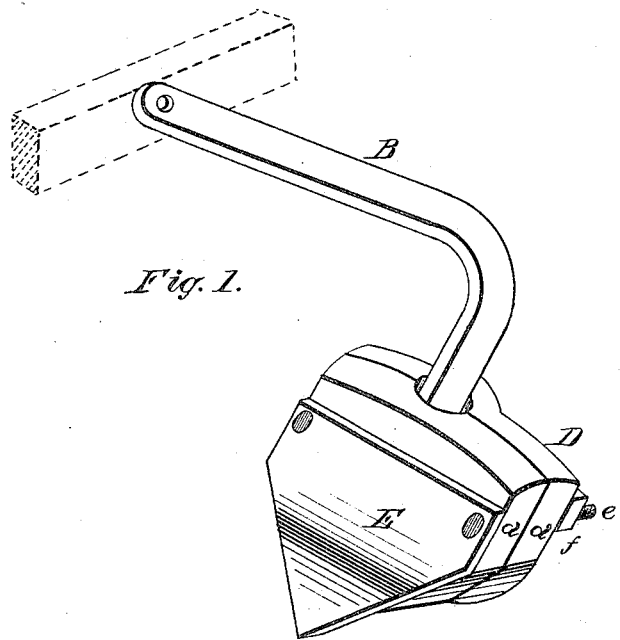
Fig. 1.
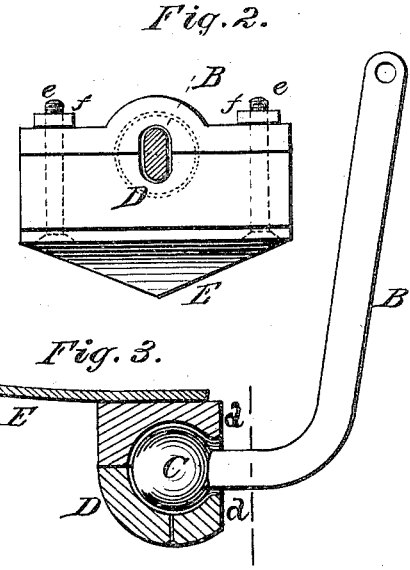
Fig. 2.
Fig. 3.
WITNESSES:
A. H. Norris
W. S. Coombs
INVENTOR:
J. C. Bannigan
By Brown & Allen
Per J. L. N.
Att'ys.

UNITED STATES PATENT OFFICE.

JOHN C. BANNIGAN, OF DUNLEITH, ILLINOIS.

IMPROVEMENT IN CULTIVATOR-TEETH.

Specification forming part of Letters Patent No. 172,373, dated January 18, 1876; application filed August 30, 1875.

*To all whom it may concern:*

Be it known that I, JOHN C. BANNIGAN, of Dunleith, in the county of Jo Daviess and State of Illinois, have invented an Improved Blade - Fastening for Cultivators; and I do hereby declare that the following is a full, clear, and exact description of the same, reference being had to the accompanying drawing, in which—

Figure 1 is a perspective view of my invention. Fig. 2 is a longitudinal vertical section. Fig. 3 is a section taken on the line $x\ x$ of Fig. 2.

My invention relates to an improvement which is applicable to cultivators, sulky-plows, and shovel-plows of various descriptions.

The invention consists in a novel combination of a swivel or ball-and-socket joint with the blade or shovel and the standard carrying the same, whereby the blade may be adjusted and secured at different angles, both parallel with the line of travel and transversely thereto.

The standard may have its upper portion of any suitable construction, and may be attached to the draw-beam of the implement in the usual or any suitable manner. It is represented herein as attached to a beam, (shown in dotted lines,) by means of a bolt passed through the upper part of the standard B, and into the side of the beam. The lower end of the standard B may be straight or curved forward, and is provided with a ball, C, which engages with a socket, D, attached to the blade E. The socket D is made in two parts, $d\ d$, which are secured to each other and to the blade E by means of bolts $e\ e$ and nuts $f\ f$. The ball C is slightly larger than the socket D, so that it may be clamped tightly therein without actual contact of the faces of the two halves of the socket with each other. By means of this ball-and-socket connection the blade or shovel of a cultivator or plow may be adjusted at any desired angle with relation to the standard, either parallel with the line of travel of the implement or transversely thereto, by loosening the nuts $f$, so as to allow the blade to be turned, and again tightening the nuts, so as to hold the blade firmly in position.

If desired, the two halves of the socket may remain rigidly secured together, and may be provided with a set-screw having its point arranged to bear upon the surface of the ball, and the adjustment may be made by loosening the set-screw, and placing the blade in the desired position, and again tightening the screw.

What I claim as new, and desire to secure by Letters Patent, is—

The combination of the standard B and its ball C with the socket D, constructed in two parts, $d\ d$, clamped together and secured upon the ball of the standard, the lower part of the socket carrying the shovel or plow-share E, substantially as described.

JOHN C. BANNIGAN.

Witnesses:
THOMAS MAGUIRE,
JOSEPH LEITHNER.